(12) United States Patent
Asemani

(10) Patent No.: US 10,935,811 B2
(45) Date of Patent: Mar. 2, 2021

(54) VISOR MOUNTED EYEWEAR

(71) Applicant: Eissa Nick Asemani, Ellicott City, MD (US)

(72) Inventor: Eissa Nick Asemani, Ellicott City, MD (US)

(*) Notice: Subject to any disclaimer, the term of this patent is extended or adjusted under 35 U.S.C. 154(b) by 93 days.

(21) Appl. No.: 16/109,987

(22) Filed: Aug. 23, 2018

(65) Prior Publication Data

US 2020/0064652 A1   Feb. 27, 2020

(51) Int. Cl.
*G02C 3/02* (2006.01)
*A42B 1/24* (2006.01)
*F16C 11/06* (2006.01)
*A42B 1/247* (2021.01)

(52) U.S. Cl.
CPC ............... *G02C 3/02* (2013.01); *A42B 1/247* (2013.01); *F16C 11/0614* (2013.01); *F16M 2200/065* (2013.01); *G02C 2200/02* (2013.01)

(58) Field of Classification Search
CPC . G02C 3/02; G02C 5/006; G02C 5/02; G02C 5/04; G02C 5/08; G02C 5/14–20; G02C 2200/02; F16C 11/0614; F16M 2200/065
USPC .......................................... 351/111–123, 155
See application file for complete search history.

(56) References Cited

U.S. PATENT DOCUMENTS

| | | | |
|---|---|---|---|
| 2,523,885 A | 9/1950 | Springer et al. | |
| 2,717,385 A | 9/1955 | Linster et al. | |
| 2,766,657 A | 10/1956 | Nathan et al. | |
| 5,009,496 A | 4/1991 | Holtan, Jr. et al. | |
| 5,056,164 A | 10/1991 | Lisle et al. | |
| 5,412,812 A | 5/1995 | Gatchalian | |
| 5,533,207 A | 7/1996 | Diaz | |
| 5,689,827 A | 11/1997 | Ryder | |
| 5,692,234 A | 12/1997 | Yuen | |
| 5,720,040 A | 2/1998 | Simone | |
| 5,826,271 A | 10/1998 | Garrett | |
| 6,174,058 B1 | 1/2001 | Hsiao | |
| 6,193,368 B1* | 2/2001 | George | G02C 5/00 351/111 |
| 6,247,205 B1 | 6/2001 | Damadian et al. | |
| 6,275,992 B1 | 8/2001 | Bondy | |
| 6,595,635 B2 | 7/2003 | Schubert | |
| 6,611,959 B1 | 9/2003 | Lando | |
| 6,641,266 B1 | 11/2003 | Lazarus | |
| 7,172,284 B1 | 2/2007 | Sasaki | |
| 7,240,370 B2* | 7/2007 | Lerner | A42B 1/247 2/10 |
| 7,441,737 B2 | 10/2008 | Bae Park | |

(Continued)

FOREIGN PATENT DOCUMENTS

WO   WO-2018154507 A1 *   8/2018   ............. A42B 3/185

*Primary Examiner* — Nicholas R. Pasko
(74) *Attorney, Agent, or Firm* — Dunlap Bennett & Ludwig, PLLC; Brendan E. Squire

(57) ABSTRACT

A visor mountable eye wear. The eyewear includes a clip for mounting onto a visor or brim of a headgear, such as a cap. The eyewear has articulating support arms to permit the eyewear to be attached to the visor of a cap and worn over the eyes of the wearer. The eyewear may be readily elevated to be repositioned atop the visor of the cap. At least one lens is carried by a frame assembly. The frame assembly may include a left and a right frame segment releasably joined by a magnet carried in a corresponding left and right bridge members.

12 Claims, 4 Drawing Sheets

(56) References Cited

U.S. PATENT DOCUMENTS

| | | | |
|---|---|---|---|
| 8,132,908 B2* | 3/2012 | Cargnel | G02C 5/20 |
| | | | 351/63 |
| 8,210,676 B1* | 7/2012 | Hunt | G02C 9/04 |
| | | | 351/133 |
| 9,723,886 B2 | 8/2017 | Burse | |
| 2007/0033775 A1 | 2/2007 | Hsiao | |
| 2007/0256214 A1* | 11/2007 | Mcgowan | A61F 9/045 |
| | | | 2/209.13 |
| 2011/0225707 A1 | 9/2011 | Millios | |
| 2012/0297522 A1 | 11/2012 | Treger et al. | |

* cited by examiner

VISOR MOUNTED EYEWEAR

BACKGROUND OF THE INVENTION

The present invention relates to eyewear, such as sunglasses, and more particularly eyewear that may be worn with a cap or other head wear with a visor or bill.

The temple tips of sunglasses have a tendency to hurt the area above the ears when worn with baseball hats and where the temple tips meet the side panels of the hat.

In addition, many times a user will want to elevate their eyewear to rest on their head so that they can have an unobstructed view, or in the case of sunglasses, to quickly transition to a darkened environment. This can be difficult with conventional eyewear.

As can be seen, there is a need for an improved eyewear for use with a cap or brimmed headgear.

SUMMARY OF THE INVENTION

In one aspect of the present invention a headwear mountable eyewear is disclosed. The eyewear includes a frame assembly having a first frame member and a second frame member detachably interconnected by a magnet carried in a left bridge and a right bridge of the frame assembly. A lens is carried in at least one of the first frame member and the second frame member. An articulating support arm is attached to a lateral aspect of the frame assembly. A clip is attached to an aft end of the articulating support arm. The clip has a channel defined therein adapted to receive an edge of a visor of the headwear.

In some embodiments, the articulating support arm includes a plurality of interconnected support arm segments. The segments include a yoke defined at a first end of each of the plurality of support arm segments, the yoke defines a yoke socket. A ball is defined at a second end of the segment. The ball of a subsequent support arm segment is received in the yoke socket of a preceding support arm segment.

In other embodiments, the frame assembly may also include a frame socket defined at the lateral aspect of the frame assembly. The frame socket is dimensioned to receive the ball of a first support arm segment. The clip may also include a ball dimensioned to be received in a socket of a terminal support arm segment.

The at least one lens may include an optical lens, a sunglass lens, or a safety lens.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles visor mounted glasses, since the scope of the invention is best defined by the appended claims.

Broadly, embodiments of the present invention provide an eyewear that is mountable to a hat. The eyewear may be quickly adjusted so that it may be elevated to a position atop the hat.

Figure 1:
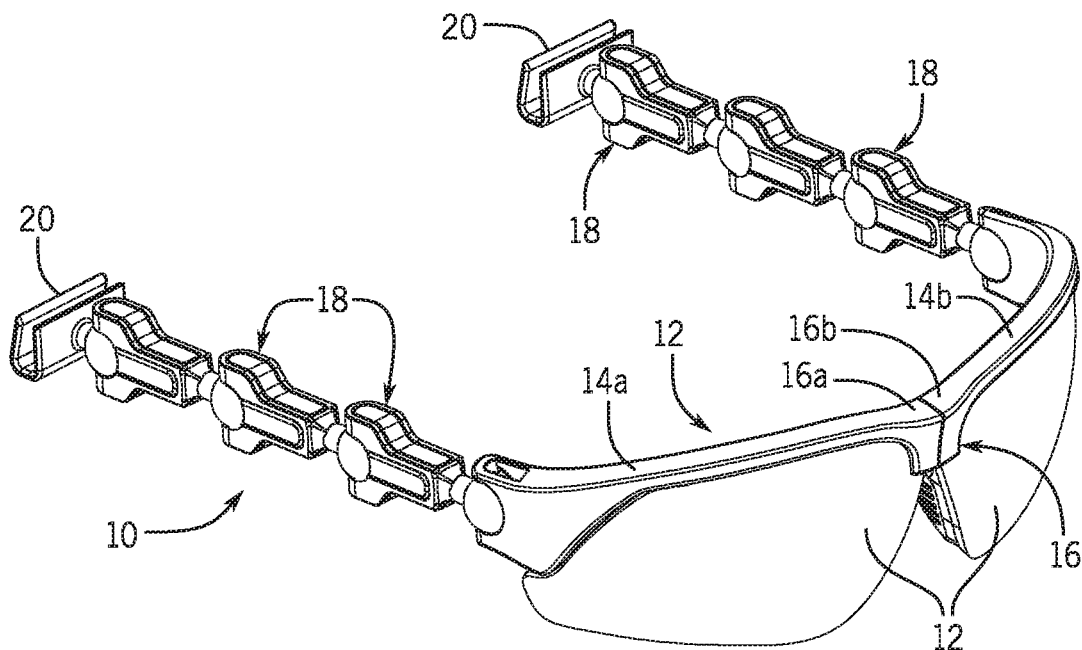
FIG. 1 is a perspective view visor mounted glasses.
Figure 2:
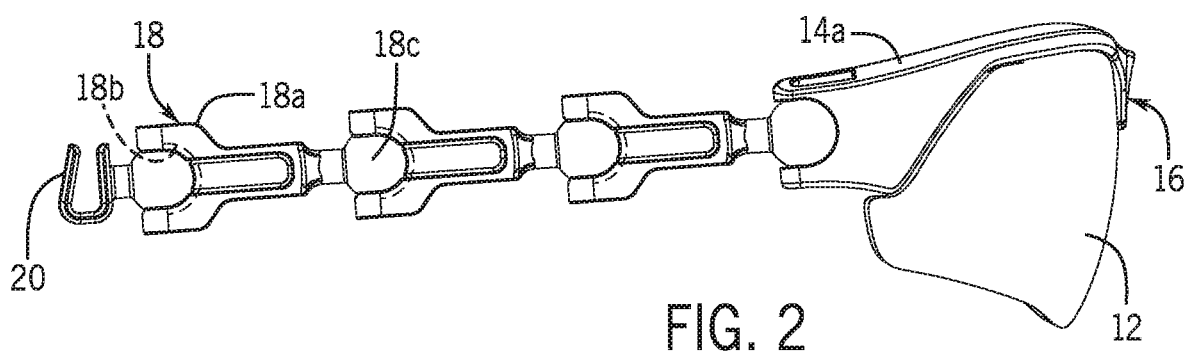
FIG. 2 is a side elevation view visor mounted glasses.
Figure 3:
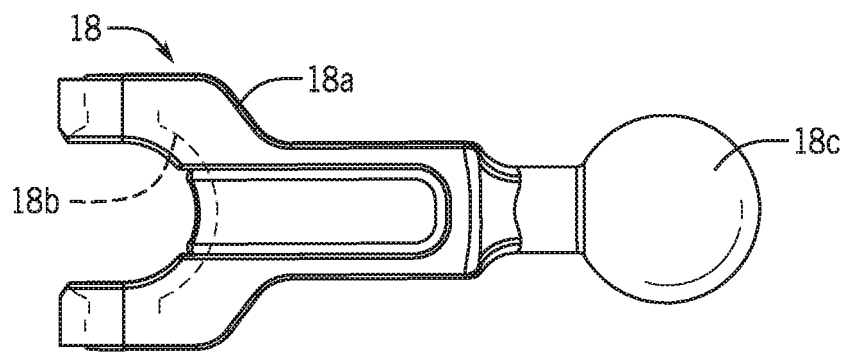
FIG. 3 is a detail side elevation view of one of the articulated members.
Figure 4:
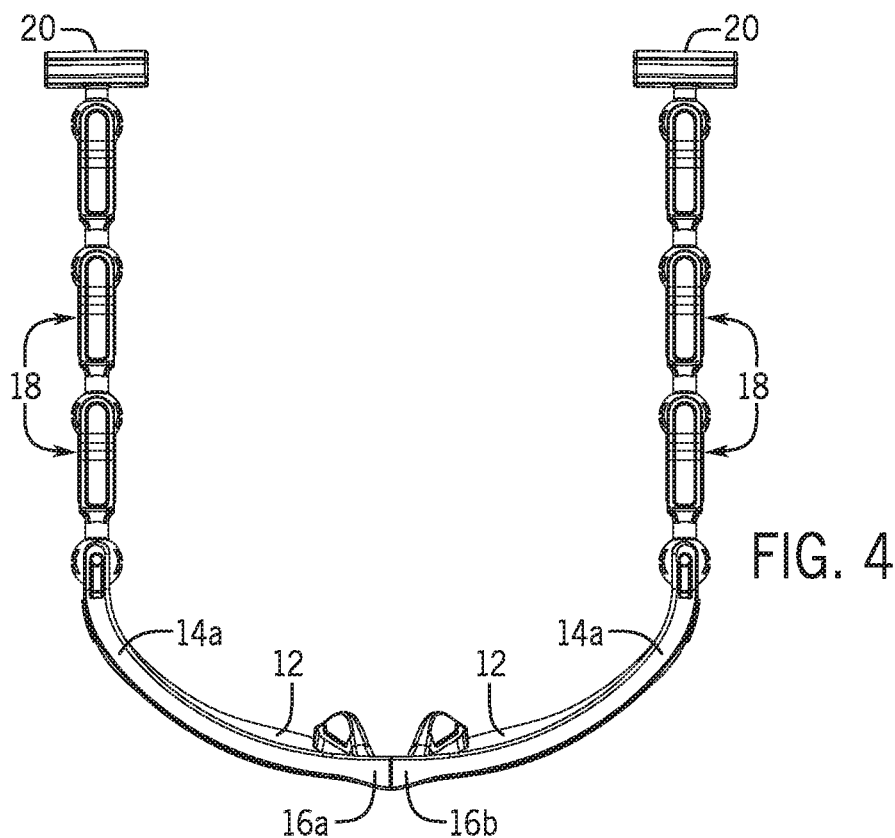
FIG. 4 is a top plan view.
Figure 5:
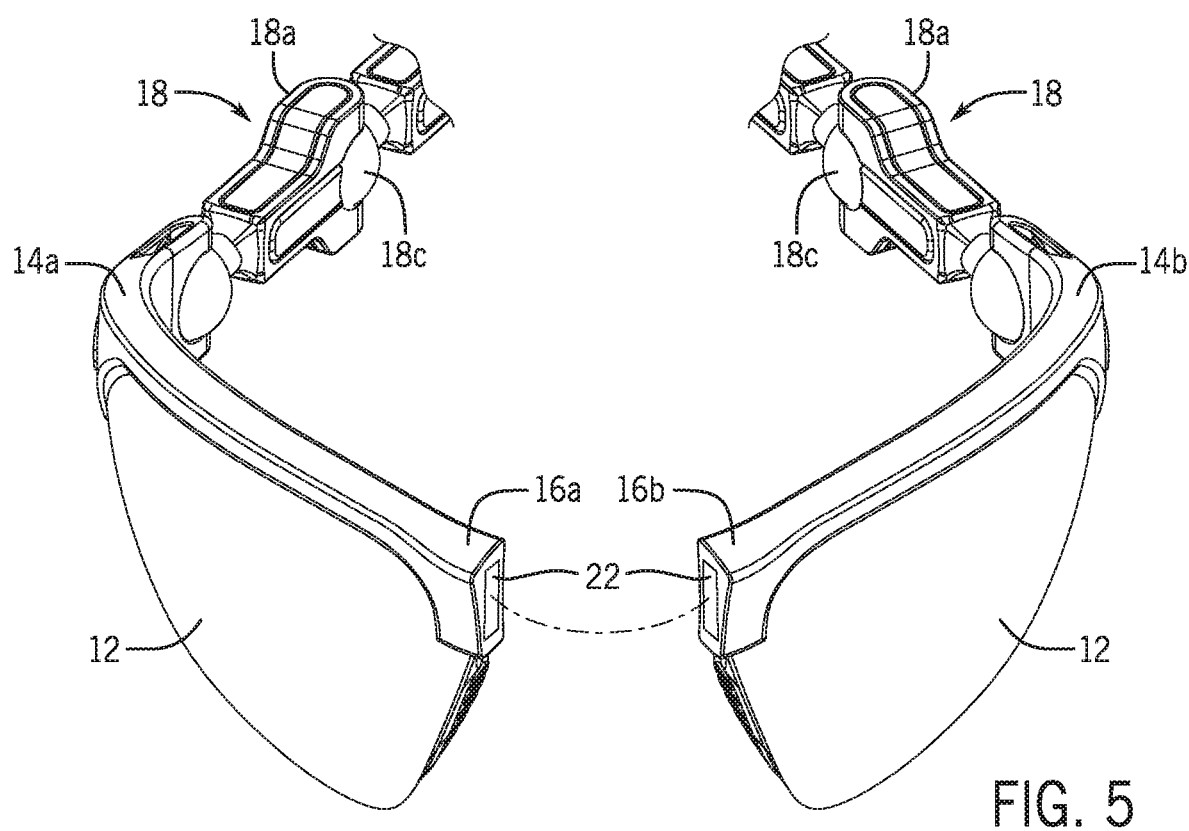
FIG. 5 is an exploded perspective view.
Figure 6:
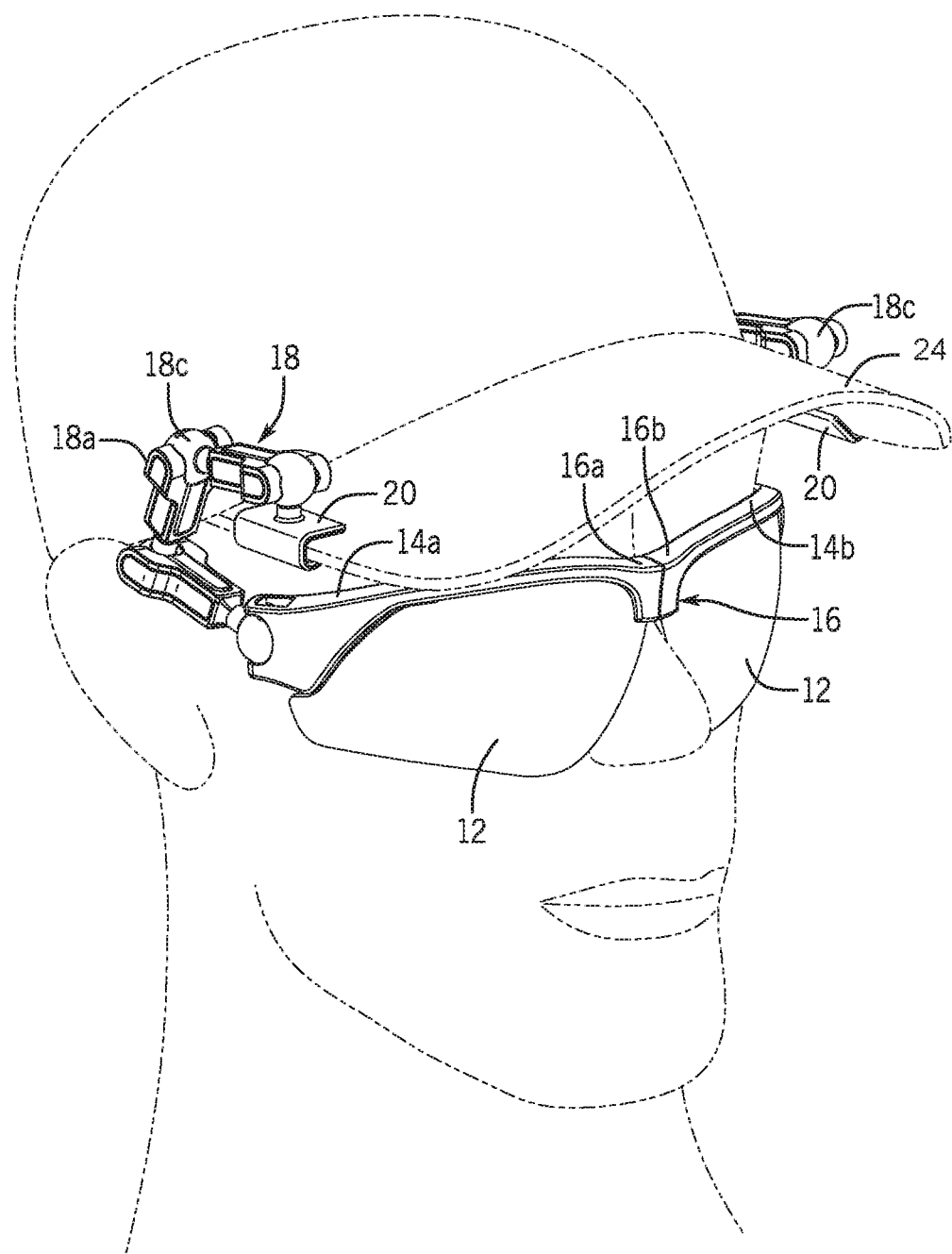
FIG. 6 is a perspective view visor mounted glasses in use.
Figure 7:
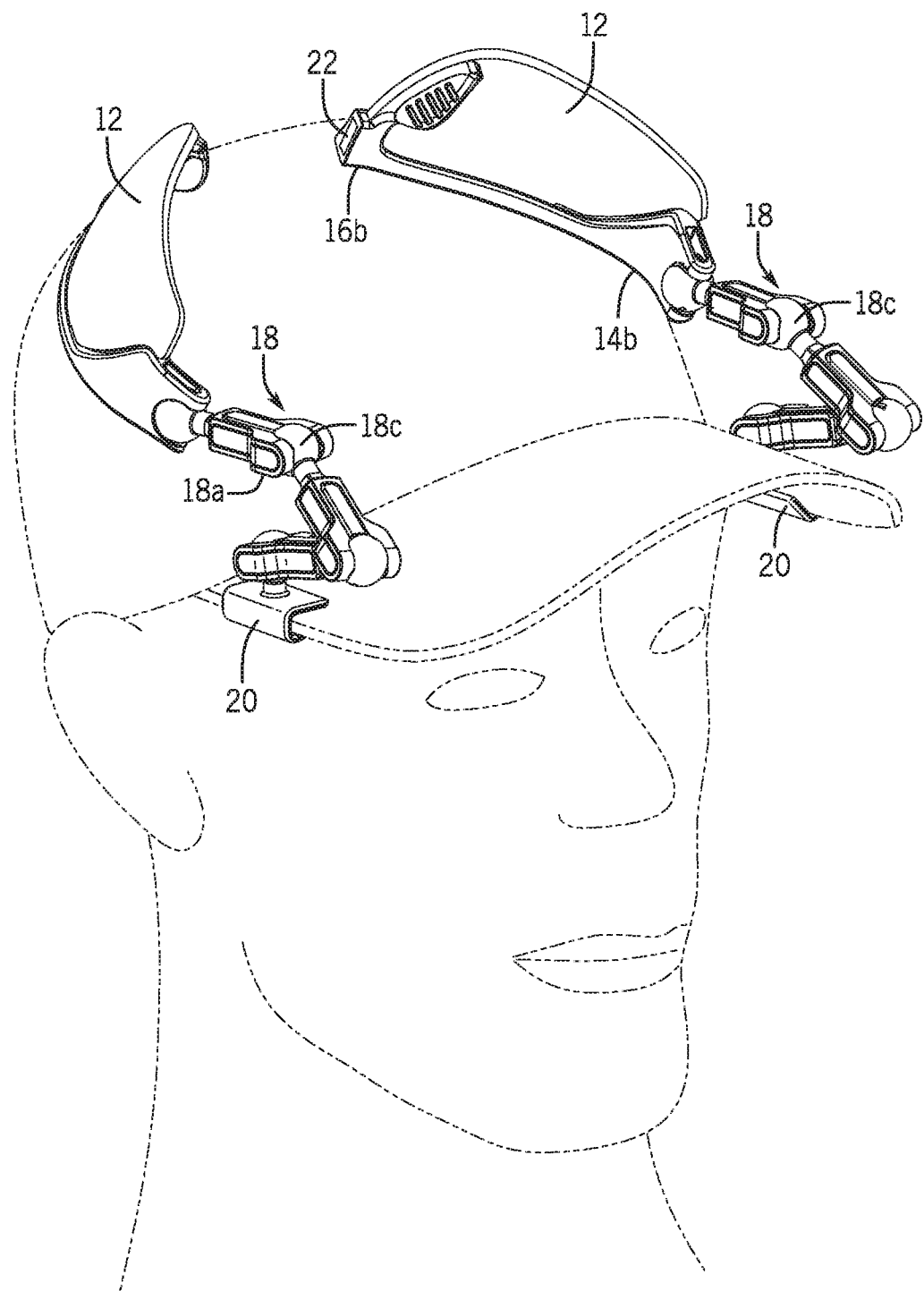
FIG. 7 is a perspective view visor mounted glasses in use in a second orientation.

As seen in reference to the drawings of FIGS. 1-7, the visor mounted eyewear 10 includes at least one lens 12 attached to a frame member 14. The at least one lens 12 may be one or more of a prescription optical lens, a sunglass lens, or a eye protective safety lens.

The frame member may include a right frame element 14a and a left frame element 14b joined by a bridge assembly 16 that rests upon a user's nose. In some embodiments, the bridge assembly 16 includes right bridge 16a and a left bridge 16b that are removably connectable by a magnet 22 carried in adjoining ends of the right bridge 16a and the left bridge 16b. In some embodiments, the joint may include a snap fit interconnection.

The frame assembly 16 is carried by a support arm 18. A clip 20 is attached at an end of the support arm 18. The clip 20 is configured to articulate about a longitudinal and lateral axis of the support arm 18. The support arm 18 may be formed by a plurality of interlocking segments 18. Each segment includes a yoke 18a defined at a first end of the segment 18. The yoke 18a defines a socket 18b. A ball 18c is defined at a second end of the segment 18, such a ball 18c of a successive segment 18 is received in the socket 18c of a preceding segment 18. In a preferred embodiment, the lateral aspects of the right 14a and left 14b frame elements are configured with a socket adapted to receive a ball 18c of a first support arm segment 18.

The clip 20 has an elongate slot that is adapted to receive visor 24, or brim of a wearer's headgear, such as a baseball cap. The clip 20 may also have a ball 20a protruding from the clip 20. The ball 20a is configured to interconnect with the socket 18b of a terminal support arm segment 18.

In use, the wearer would attach the clips 20 to the visor 24. The support arms 18 may be articulated so that the bridge assembly 16 is positioned on the wearer's nose with the at least one lens 12 positioned over the wearer's eyes. To elevate the eyewear 10, the user may separate the left and right frame members 14a, 14b and raise the frames 14a, 14b above the visor 24. The user may then rejoin the frame members 14a, 14b, so that the magnets 22 in the bridges 16a, 16b are attracted to one another to hold the frame assembly 14 together with the eyewear resting upon the visor 24.

It should be understood, of course, that the foregoing relates to exemplary embodiments visor mounted glasses and that modifications may be made without departing from the spirit and scope visor mounted glasses as set forth in the following claims.

What is claimed is:
1. A headwear mountable eyewear, comprising:
a frame assembly having a first frame member and a second frame member detachably interconnected by a magnet carried in a left bridge and a right bridge of the frame assembly;
a lens carried in at least one of the first frame member and the second frame member;
an articulating support arm having a plurality of interconnected support arm segments attached to a lateral aspect of the frame assembly, a yoke defined at a first end of each of the plurality of support arm segments, the yoke defining a yoke socket, a ball defined at a second end of each of the plurality of support arm segments, wherein the ball of a subsequent support arm segment is received in the yoke socket of a preceding support arm segment;

a socket defined at a lateral end of the frame assembly, the socket connect to a ball of a proximal support arm segment;

and a clip attached to an aft end of the articulating support arm, the clip having a channel defined therein adapted to receive an edge of a visor of the headwear, and a ball protruding from the clip, the ball connected to the yoke of a distal support arm segment.

2. The headwear mountable eyewear of claim 1, wherein the at least one lens comprises a prescription optical lens.

3. The headwear mountable eyewear of claim 1, wherein the at least one lens comprises a sunglass lens.

4. The headwear mountable eyewear of claim 1, wherein the clip further comprises:
a ball dimensioned to be received in a socket of a terminal support arm segment.

5. The headwear mountable eyewear of claim 1, wherein the lens is carried by by a unitary frame element extending between the joint and the frame socket.

6. The headwear mountable eyewear of claim 1, wherein each of the plurality of segments are interchangeable.

7. The headwear mountable eyewear of claim 1, wherein the articulating support arm further comprises:
wherein each of the plurality of support arm segments are configured to articulate about a longitudinal and lateral axis of the articulating support arm.

8. The headwear mountable eyewear of claim 7, wherein the frame assembly further comprises:
a frame socket defined at the lateral aspect of the frame assembly, wherein the frame socket is dimensioned to receive the ball of a first support arm segment.

9. A headwear mountable eyewear, comprising:
a frame assembly having a first frame member and a second frame member releasably interconnected at a joint between a left bridge and a right bridge of the frame assembly, the frame configured to carry a lens in at least one of the first frame member and the second frame member, a frame socket defined at a lateral aspect of the frame assembly;

a segmented articulating support arm attached to a lateral aspect of the frame assembly the segmented articulating support arm configured with a plurality of segments wherein each of the plurality of segments articulate about a longitudinal and lateral axis, a ball of a first segment received in the frame socket; and a clip attached to an aft end of the articulating support arm, the clip having a channel defined therein adapted to receive an edge of a visor of the headwear, and a ball coupled to a yoke of a terminal support arm segment.

10. The headwear mountable eyewear of claim 9, wherein the joint further comprises:
a magnet carried in each of the left bridge and the right bridge to releasably interconnect the first frame member and the second frame member.

11. The headwear mountable eyewear of claim 9, wherein the lens is carried by by a unitary frame element extending between the joint and the frame socket.

12. The headwear mountable eyewear of claim 9, wherein each of the plurality of segments are interchangeable.

* * * * *